July 5, 1960

F. E. FAUTH 2,943,722

ARTICLE FEEDING MECHANISM

Filed March 28, 1958

INVENTOR
FREDERICK E. FAUTH

BY Cushman, Darby & Cushman
ATTORNEYS

July 5, 1960 F. E. FAUTH 2,943,722
ARTICLE FEEDING MECHANISM
Filed March 28, 1958 5 Sheets-Sheet 2

INVENTOR
FREDERICK E. FAUTH
BY

ATTORNEYS ated July 5, 1960

2,943,722

ARTICLE FEEDING MECHANISM

Frederick E. Fauth, Baltimore, Md., assignor to Crown Cork & Seal Company, Inc., Baltimore, Md., a corporation of New York Filed Mar. 28, 1958, Ser. No. 724,769

11 Claims. (Cl. 198—32)

The present invention relates to an article feeding mechanism and, more particularly, to a mechanism for arranging articles in a particular manner while the articles are being transferred from one station to another station.

The feeding of containers, such as bottles or cans, between various machines in bottling or canning plants or the like, involves substantial difficulties, particularly if a single machine for performing one operation receives the articles from a plurality of machines performing another operation. Where the machine performing an operation on the articles is capable of handling a great number of articles, it is oftentimes necessary to utilize two or more machines to supply the articles thereto. When such a condition exists, it is necessary to combine a plurality of rows of articles into a single row of article and the problem of combining is tremendously increased when the linear speeds necessary to transfer the articles is high. In present-day bottling and canning plants it is oftentimes necessary to supply containers to a machine operating on the containers at a rate of twelve hundred containers per minute. Usually, the machine performing a previous operation is not capable of operating at such high speeds and, consequently, two or more lines of containers from these machines must be combined to feed the machine operating at a higher speed.

An example of where it is necessary to combine articles traveling at high linear speeds is in a bottling plant where containers such as cans are transferred from seamers to a packer. The present-day packer has a capacity of approximately twelve hundred containers per minute, whereas the seamers have much lower capacity. Consequently, the present mechanism is capable of receiving containers from two seamers having a capacity of approximately six hundred containers per minute each, and combining them for delivery to the packer. The mechanism of the present invention may be used in transferring containers between other machines in a bottling plant where the capacity of the machines vary. A filling machine oftentimes has a capacity greater than the soakers or washers and therefore it is necessary to utilize a number of soakers or washers to supply containers to a single filling machine.

Although the problems discussed above have been stated in terms of containers and the embodiment of the invention hereinafter described discloses the mechanism as used in handling beverage containers, it will be understood that the invention is entirely applicable to the handling of articles other than containers and which are of various shapes and forms, wherever it is desired to combine articles traveling in a plurality of rows to a lesser number of rows.

Heretofore, various mechanisms have been proposed for combining containers or other articles into a single row. Usually, the rows which are combined travel at a lower linear speed than the row of containers after the combining operation, the linear speed of the containers being increased just prior to the combining operation. When linear speeds necessary to deliver containers, for example, at a rate of twelve hundred containers per minute are encountered, the arrangements heretofore propose have not been entirely satisfactory, as it has been found that the containers are apt to jam, upset or be marred during their delivery to the transfer and combining mechanism and during the actual combining of the containers. Such a drawback especially arises where the containers are bottles or cans, because bottles and cans are of relatively lightweight and substantial height, but have a small base area.

An object of the present invention is to provide an article-feeding mechanism which will be essentially free from jamming when containers are being transferred from a plurality of rows and combined into a lesser number of rows, where the containers initially travel at a relatively high linear speed and are combined into a row traveling at an even higher linear speed.

Another object of the present invention is a mechanism having improved means for transferring articles traveling at random in rows at high linear speeds into a combining mechanism.

A further object is to provide a mechanism for combining a plurality of rows of articles into a lesser number of rows of articles whereby articles traveling at random in the plurality of rows can be smoothly engaged, spaced and fed to the combining mechanism without the possibility of the articles being upset.

These and other objects of the present invention will be more apparent from the following specification, claims and drawings, in which:

Referring now to the drawings, wherein like characters or reference numerals represent like or similar parts, and more specifically to Figures 1 to 6, the article-feeding mechanism of the present invention is illustrated for combining separate rows of articles into a single row of articles, the articles traveling in the direction indicated by the arrows A. The embodiment of the invention disclosed is preferably used in combining articles or containers, such as bottles and cans, and the following description will refer to the articles broadly as "containers" although it will be understood that it is within the scope of the present invention to use the mechanism wherever it is desired to combine two or more rows of articles other than bottles and cans into a lesser number of rows of articles.

Any suitable frame structure, generally designated by the numeral 10 and having a table portion 12, may be utilized to support the article feeding mechanism of the present invention. The frame structure 10 is provided with supporting legs or pedestal 14 which may be adjusted for various heights so that the device may be adjusted and used with existing conveyor lines within a plant.

Table 12 supports a first conveyor means which includes two container conveying elements 16 and 18. The elements 16 and 18 are straight-line endless link-type conveyors formed of flat plates and are suitably guided in the upper surface of the table 12. For purposes of description the elements 16 and 18 would receive containers from separate machines in the bottling or canning plants, the machines performing the same operation on the containers.

A second conveyor means including a third container conveying element 20 is adapted to receive the containers from the elements 16 and 18 and transfer the containers to a machine performing a subsequent operation on the containers. The conveying element 20 may be of the same type as the conveying elements 16 and 18, that is, a straight-line endless link-type conveyor formed of flat plates. As previously mentioned, the machine to which the containers are being fed has a capacity higher than the capacity of the machines from which the containers are fed and, consequently, the containers must be combined and their linear speed increased so as to meet the demands of the higher speed machine. An example in a bottling plant would be the transfer of containers from two washers or soakers to a single filling machine or the transfer of cans from a pair of seamers to a packer.

In the copending United States application for Letters Patent, Serial No. 399,998, filed December 23, 1953 of Rudolph H. Breeback for Container Feeding Mechanism, a combiner mechanism is disclosed wherein a plurality of rows of containers are combined into a single row of containers, the containers in the plurality of rows being initially and individually engaged by helical conveyor elements and spaced, the individual engagement and positive control of the containers being maintained until the containers have been combined in a single row. The present invention discloses an improved mechanism for combining the containers by maintaining individual control of the containers until in the outfeed row, as well as improved means for transferring containers supplied at random into the threads of the helical conveyor elements. When extremely high linear speeds are encountered in the infeed lines of containers to be combined, it has been found desirable to provide for preliminary engagement and spacing of the containers prior to their coming under control of the helical conveyor elements. The present invention provides for such control so that there cannot be any jamming or tipping over of containers.

Figure 1:
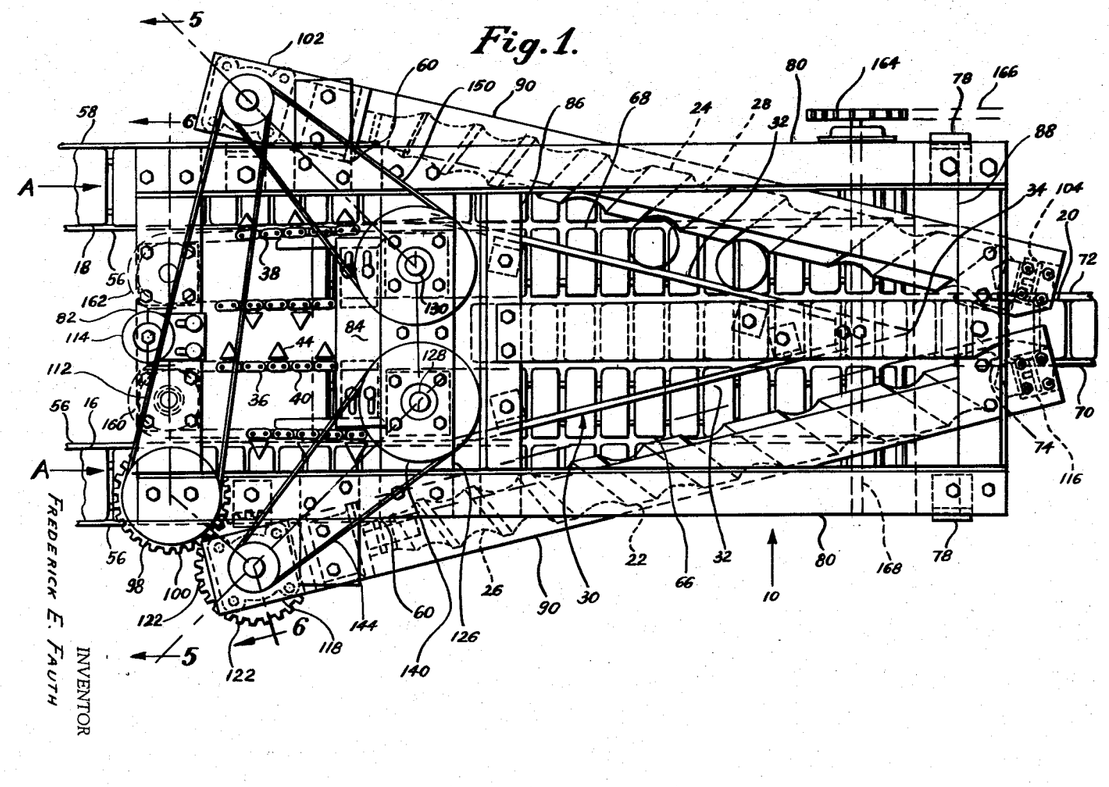
Figure 1 is a plan view of one form of combining mechanism of the present invention.
Figure 2:
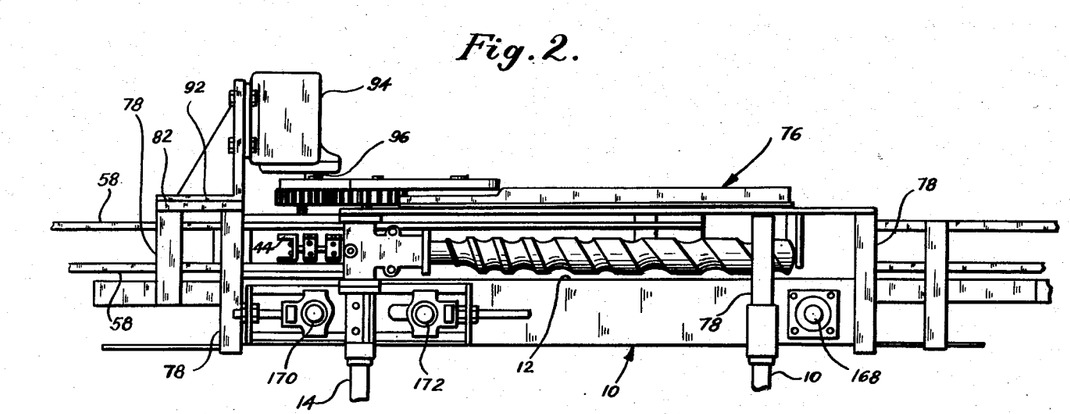
Figure 2 is a side elevational view of the mechanism disclosed in Figure 1.

In more detail, conveying elements 16 and 18 deliver containers to a pair of helical conveyor elements 22 and 24 respectively. The helically threaded elements 22 and 24 are arranged above the conveying elements 16 and 18 respectively and converge toward one another, as shown in Figure 1. Element 22 is provided with a thread 26 increasing in pitch so as to progressively increase the linear speed and spacing of containers received thereby. Element 24 has a thread 28 similar to the thread 26 which progressively increases the linear speed and spacing of articles received from conveying element 18. However, the threads 26 and 28 of the elements 22 and 24 are symmetrically out of phase with each other so that when containers reach the outfeed end of the respective helical elements they will be alternately interposed and transferred onto conveying element 20. A center guide element 30 which has lateral sides or surfaces 32 which converge toward the outfeed conveying element 20 and terminate in an apex end 34, provides means for retaining containers in the pockets or threads of the respective helical conveyor elements or feed screws 22 and 24.

By having the helical conveying elements or feed screws 22 and 24 rotating on horizontal axes converging toward one another at an acute angle of approximately thirty degrees (30°), it has been found that it is not necessary to provide complete control of the articles after they leave contact with the apex 34 of the guide 30 and the threads of the feed screws, especially when containers are traveling at high linear speeds. Since there is no abrupt change in the direction of the container when it passes the combining point, the inertia of the container, once it is carried onto the conveying element 20, is sufficient to move the same to the center of the conveying element where it is then transferred away from the combining mechanism. If desired, a conveyor, such as shown in the aforementioned Breeback application, may be provided alongside of the conveying element 20 to control spacing between containers on this conveyor. If the containers are being delivered to a rotary infeed dial of a filling machine, such spacing would be maintained up until the time the containers are received in the pockets of the rotary infeed dial. On the other hand, if the containers are being delivered to a packer or to a machine located at a remote distance from the combining mechanism, spacing of the containers need not be controlled on the conveying element 20.

As previously mentioned, machines presently used in bottling or canning plants have capacities for performing operations on containers up to twelve hundred containers per minute. To feed containers to these machines, it is often times necessary to take two rows of containers delivering approximately six hundred containers per minute and then combine these containers into a single row traveling at approximately twice the speed so as to feed sufficient quantity to the machine operating on twelve hundred containers per minute. When containers traveling on the conveying elements 16 and 18 are delivered to the threads of the helical conveyor elements 22 and 24 they will, for example, be traveling at a velocity of 130 feet per minute and their velocity has to be increased to approximately 260 feet or more per minute on conveying element 20. Containers traveling at 130 feet per minute cannot be fed smoothly, at random, to the threads of the helical conveyor elements 22 and 24 because if they hit the land of the element rather than the pocket formed by the thread, their inertia will tend to tip them over or cause a jam. Consequently, the containers traveling on conveying elements 16 and 18 must be initially and individually engaged and spaced so that when they arrive at the infeed end of the helical conveyor elements 22 and 24, they will be delivered there precisely at the time that they can be received into the thread.

Endless conveying elements 36 and 38, having a plurality of flights thereon defining container-receiving pockets, are adapted to cooperate respectively with the conveying elements 16 and 18 to receive, properly position and control the containers, so that they may be delivered smoothly and precisely into the threads of helical conveying elements 22 and 24.

Figure 3:
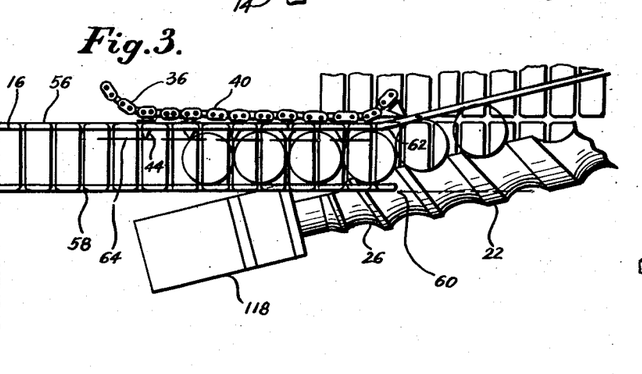
Figure 3 is a fragmentary view of the mechanism in Figure 1 showing the means for picking up and spacing containers traveling on an infeed conveyor and transferring them to the helical threads of the feed screw of the combining mechanism.
Figure 4:
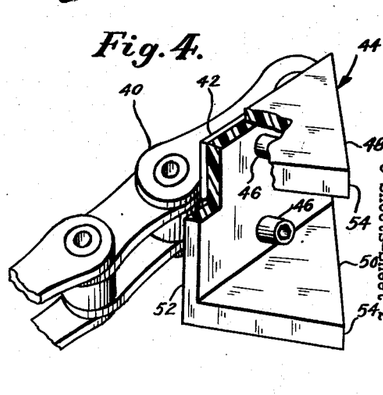
Figure 4 is an enlarged perspective view of one of the tapered blocks for spacing and transferring articles to the helical screws of the combiner mechanism.

Referring specifically to Figures 3 and 4, the endless conveying elements 36 and 38 are substantially identical in structure and, therefore, the description of one will suffice for both. The endless conveying element 36 comprises an endless link chain 40, spaced links of the chain having oppositely disposed upward and downwardly extending lugs 42, one of which is shown in Figure 4. A tapered block member 44 is attached to the lugs 42 by nut and bolt assemblies 46. The tapered block members 44 are shaped as shown in Figure 4 so as to provide two wedge-shaped members 48 and 50 extending outwardly from a cross-member 52, the members 48 and 50 being spaced vertically from one another so as to engage a container over a greater portion of its vertical surface. The blocks 44 may be molded from synthetic linear superpolyamides e.g. a condensation product of hexamethylene diamine with adipic acid or the polymer epsilon caprolactam, commonly known as nylon. Typical examples of nylon are disclosed in the Carothers Patent No. 2,071,250. The apex or tips 54 of the block members 44 are spaced from the apex or tips of an adjacent block member a distance at least equal to the diameter of a container. The endless conveying element 36 is operated at a linear speed equal to or slightly less than the linear speed of the conveying element 16. As a container approaches the helical conveying element 22 on conveying element 16, the tapered blocks will wedge between successive containers and will space the containers so that they may be fed in timed sequence to the infeed portion of the thread 26 of the element 22.

In more detail, and referring to Figures 1 and 3, it will be noted that the endless conveying elements 36 and 38 are arranged to travel in a horizontal orbit above the conveying elements 16 and 18 respectively. Spaced guide rails 56 and 58 which define the path of travel of containers on the conveying elements 16 and 18, guide the containers toward the helical conveying elements 22 and 24. It will be noted that the guide rails 58 terminate adjacent the infeed end of the conveying elements 22 and 24, as indicated at 60. This guide rail opposes the endless chain 36 and maintains the containers within the pockets of the chain as defined by the flights of tapered block members 44. On the other hand, guide rails 56 extend to a point where they merge with the center guide element 22, as indicated at 62 in Figure 3. It will be noted in Figure 3 that the path of the endless chain or belt 40 is such that the reach of the endless chain having the tapered blocks cooperating with the conveying element 16 gradually merges toward and into the path of containers traveling on the conveying element 16 at a very slight angle thereto. The merging of the tapered block members 44 gradually, on an imaginary line indicated at 64, toward the center line of the path of travel of containers, causes the tapered block members to assume a wedging position with respect to the opposing guide rails 58. A container advancing on the conveying element 16 will either slip ahead of the block member contacted into a pocket in front of the same or fall behind into the next succeeding pocket because the block-carrying chain 40 has a resiliency which permits a slight lateral movement of the blocks and a slight pivotal movement of the blocks. Of course, if there is a container in the pocket between two block members, the next succeeding container could not get into the same pocket and would slip behind the block member, pushing the container into a succeeding pocket.

By making the tapered block members of nylon, there will be very little friction between the blocks and the container and also there will be no chance of marring the container. In addition, by forming the block members so that they have two wedge-shaped members 54 extending out from the chain in vertical spaced relationship to each other, stability in handling tall containers is obtained with a minimum of friction. Although the blocks are shown with two wedge-shaped portions 54, it is of course within the scope of this invention that a solid wedge-shaped member could be used, if desired.

As previously mentioned, the helical elements 22 and 24 have their threads symmetrically out of phase with one another so that containers received on one of the conveying elements 16 may be interposed between conveyors received from the other of the conveying elements 18. Likewise, as is disclosed in Figure 1, the endless conveying elements 36 and 38 are arranged to pick up containers respectively from the conveying elements 16 and 18 in an out-of-phase relationship with each other. The block members 44 on the endless conveying element 36 are arranged to travel at the same velocity as the block members 44 on the endless conveying member 38, but symmetrically out of phase.

After the containers are transferred by the conveying elements 36 and 38 to the respective threads of the helical elements 22 and 24, the container is maintained in the thread by the previously mentioned lateral sides or surfaces 32 of the center guide element 30. The infeed conveying elements 16 and 18 extend across the table 12 to a point where containers are eventually guided off of the same by the threaded elements 22 and 24. To assist in conveying the containers in a general direction toward one another to a position where they are interposed between one another, auxiliary straight-line conveying elements 66 and 68 are provided, these elements operating at the same linear speed as the elements 16 and 18. As the speed and spacing of the container is gradually being increased by the increasing pitch of the threads of helical conveying elements 22 and 24, it is desirable that the conveyors 66 and 68 operate at the same or a slightly higher speed to assist in conveying the containers to a point where they are combined. Although the straight-line conveyors 66 and 68, which are respectively interposed between the conveying elements 16 and 20 and 18 and 20, are disclosed, it is of course within the scope of the present invention to utilize a dead plate in this area and in such an instance the container will be conveyed across the dead plate solely by the threaded elements 22 and 24.

Once the containers reach the apex 34 of the center guide element 30, they are then under the influence of the respective threaded elements 22 and 24, as well as the take-off conveying element 20. The inertia of the containers will carry them forward to a point where they are centered on the conveying element 20 between its spaced guide rails 70 and 72. The guide rails 70 and 72 terminate just adjacent the outfeed end of the threaded elements 22 and 24, as indicated at 74 in Figure 1.

Referring to Figures 1, 2, 5 and 6, it will be noted that the frame structure 10 is provided with a superstructure, generally indicated at 76. The superstructure includes a plurality of vertical brace members 78, a pair of longitudinally extending horizontal angle members 80 supported on the brace members and positioned on opposite sides of the mechanism and a plurality of cross-members 82, 84, 86 and 88 supported by the horizontal angle members. A pair of brace members 90 carried by the superstructure 76 extend toward one another above and support the helical conveying elements 22 and 24, as will be explained in more detail later.

Mounted on the cross-members 82 is an L-shaped bracket 92 which supports an electric motor 94. The motor is mounted on the bracket 92 with its drive shaft 96 extending vertically downwardly. A sprocket 98 and a gear 100 are keyed to the drive shaft 96 for rotation thereby. The member 90 supports a gear box 102 which in turn supports one end of helical conveying element 24, as well as a journal bearing 104 for supporting the opposite end of the element. Gear box 102 has a drive shaft 106 extending upwardly through member 90. Mounted on the drive shaft 106 are a pair of sprockets 108 and 110. The sprocket 108 is adapted to receive a drive belt 112 which also passes around the previously mentioned sprocket 98. An idler pulley or wheel 114 mounted on the cross-member 82 is adjustable longitudinally of the mechanism toward and away from belt 112 so as to apply the proper tension to the belt.

Figure 5:
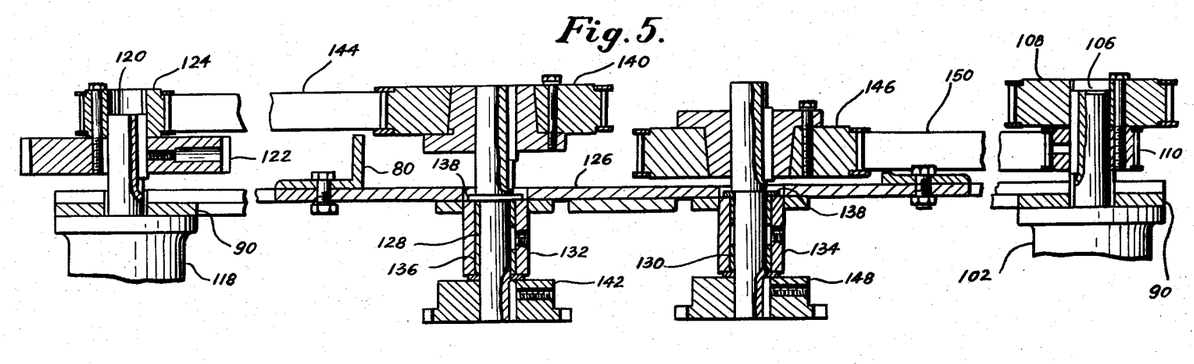
Figure 5 is a sectional view taken on the line 5—5 of Figure 1.
Figure 6:
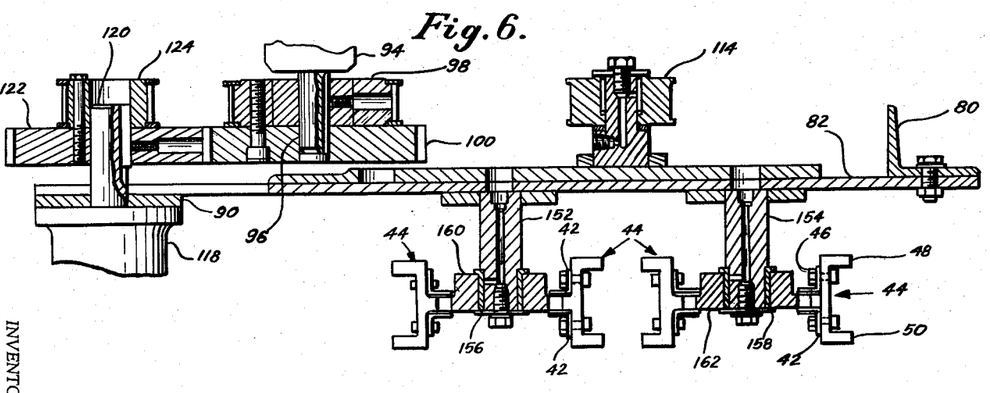
Figure 6 is a sectional view of the mechanism taken on the line 6—6 of Figure 1.

Helical conveying element 22, which is supported by the other member 90, is also provided with a journal bearing 116 at one end and a gear box 118 at its other end. The gear box 118 has its drive shaft 120 extending upwardly through the member 90 and a gear 122 and sprocket 124 are mounted thereon. The gear 122 is directly in mesh with the gear 100 mounted on the drive shaft 96 of motor 24 so that it too is driven off of the motor to thereby rotate the helical conveying element 22 in timed synchronism with the helical conveying element 24. A plate member 126 is carried by cross-members 84 and 86 and provides a means to rotatably support vertical shafts 128 and 130. As best shown in Figure 5 the plate member 126 is provided with a pair of spaced, downwardly extending bosses 132 and 134 which carry bearing sleeves 136. Each of the shafts 128 and 130 are provided with collars 138 so that the shafts are supported by the bosses in a vertical position. Shaft 128 has keyed to its upper end, extending above the plate 126, a sprocket 140, whereas its lower end depending downwardly from the plate 126 has a gear 142 keyed thereto. An endless drive belt 144 passing around the sprocket 140 and the sprocket 124 drives the sprocket 140 so as to rotate the shaft 128. Shaft 130 has a sprocket 146 keyed to its upper end extending above the plate 126, as well as a gear 148 keyed to its lower end extending below the plate. An endless belt drive 150 extends around the sprocket 146 and the sprocket 110. When the motor causes drive belt 112 to rotate the shaft 106, the sprocket 146 is also caused to rotate, thereby rotating the shaft 130.

Extending downwardly from cross-member 82 are a pair of posts 152 and 154. At the lower ends of each of the posts 152 and 154 are sleeve bearings 156 and 158 respectively. Rotatably mounted on the bearing 156 is a sprocket 160 whereas rotatably mounted on the bearing 158 is a sprocket 162. Chain 40 of endless conveying element 36 extends around the sprockets 160 and 142 whereas the endless chain 50 extends around the sprockets 162 and 148. When the shafts 128 and 130 are rotated, they will cause the endless conveying elements 36 and 38 to operate.

In summation, the helical conveying elements 22 and 24, and the endless chains 40 of the endless conveying elements 36 and 38 are driven in timed sequence to one another by the single source of power, namely, the electric motor 98. When the motor 98 is energized, the gear 100 on the motor drive shaft 96 causes the drive shaft 120 for the gear box of helical conveying element 22 to rotate. Since the sprocket 124 rotates with the drive shaft 120, it will drive the sprocket 140, which causes the sprocket 142 to rotate, thus moving the endless chain 40 of endless conveying element 36. Helical conveying element 24 rotates in synchronism with the helical conveying element 22 as it is driven off of the motor 94 through the endless belt 112. Endless belt 112 causes the sprocket 108 to rotate, to thereby drive the drive shaft 106 for the gear box 102 of element 24. Both endless conveying elements 36 and 38 are driven in synchronism from the single source of power, namely, the electric motor 98, in that each endless conveying element is driven off of the drives for the respective helical conveying elements. The belt 144 drives endless conveying element 36, whereas the belt 150 drives the endless conveying element 38.

A sprocket 164, which is driven by an endless chain or belt 166, drives each of the article-supporting conveying elements 16, 18, 66 and 68. The belt 166 may be driven from the usual power take-off of a machine associated with the combining mechanism. In more detail, the sprocket 164 is mounted on a shaft 168 which is provided with the usual sprockets (not shown) for driving the endless flat-top conveying elements 16, 18, 66 and 68. Since the article-supporting elements 66 and 68 have a relatively short reach, a shaft 170, extending beneath the table 12, carries idler sprockets for these elements. The article-supporting elements 16, 18, 66 and 68 are all driven at the same speed because the sprockets on the shaft 168 are of the same size. The usual idler sprockets for the conveying elements 16 and 18 (not shown) are provided forward of the combining mechanism as these conveying lines are quite long. The center take-off conveying element 20, as heretofore mentioned, operates at a higher linear speed than the conveying elements 16 and 18, therefore, it may be driven from the usual power take-off of a machine, with which the combining mechanism is associated. A shaft 172 extending beneath the table 12, carries the idler sprocket for the conveying element 20.

Figures 7, 8:
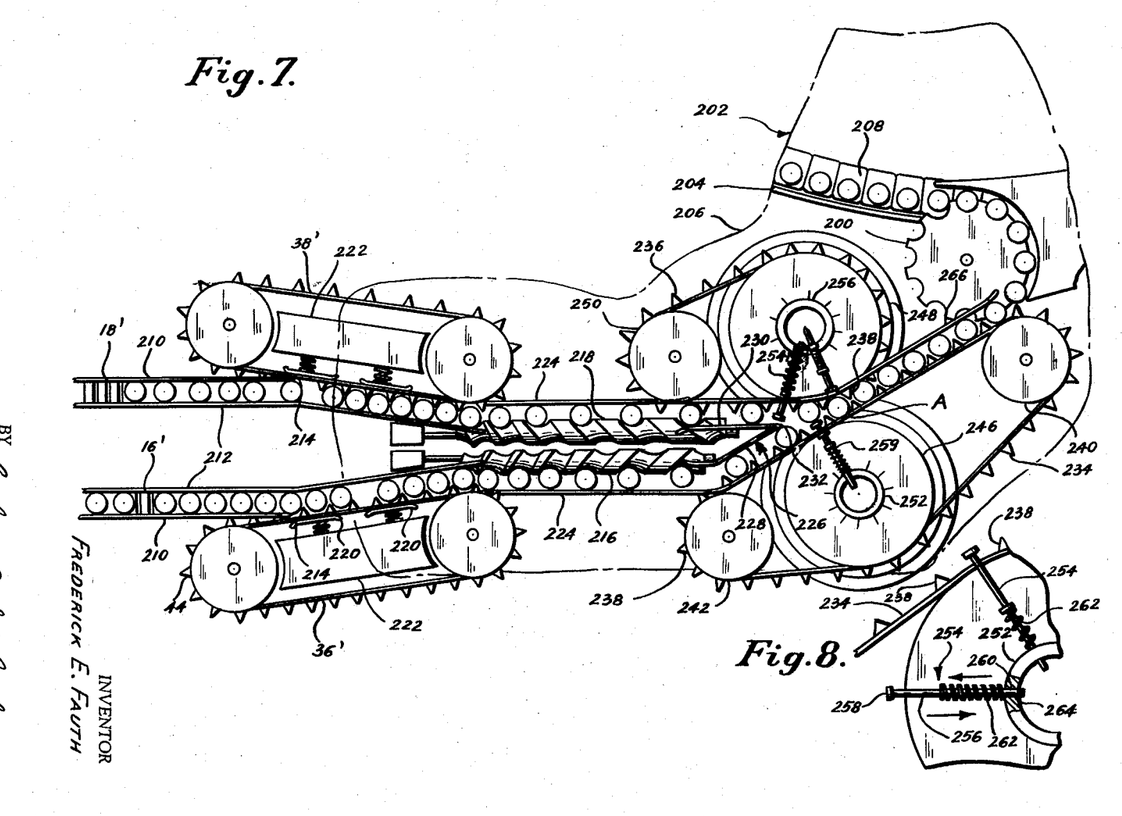
Figure 7 is a schematic plan view of a modified form of the invention and showing the combining mechanism feeding containers to the infeed dial of a filling machine.
Figure 8 is an enlarged fragmentary view of one of the endless conveying elements having the tapered blocks and showing, in detail, one of the container-actuated plungers.

Referring now to Figures 7 and 8, a modification of the present invention is disclosed for combining containers being delivered to a rotary infeed dial 200 of a rotary filling machine, represented by the numeral 202. The rotary filling machine 202 is of the usual type provided with a rotary filling table 204 journaled for rotation about a vertical axis with respect to the filling machine base structure indicated by the numeral 206. The usual container-supporting platforms 208 are provided on the rotary filling table. The base structure 206 provides a stationary worktable for feeding the containers to the platforms of the filling machine.

In the form of the invention disclosed in Figure 7 the first conveyor means, including the two flat-top container conveying elements 16' and 18' delivers two rows of containers to the table 206, where the containers are combined into a single row. An endless conveying element 36' is associated with the container supporting and conveying element 16', whereas, an endless conveying element 38' is associated with the container supporting and conveying element 18'. The elements 36' and 38' are constructed identically with the elements 36 and 38, previously described, in that each is provided with a plurality of block members 44 which define container-receiving pockets. Also, the elements 36' and 38' are arranged to intercept articles traveling on the conveying elements 16' and 18' at an angle to the direction of the articles. However, in the arrangement shown in Figure 7, the elements 36' and 38' change the direction of travel of the containers so that they converge slightly toward one another. Conveying elements 16' and 18' are each provided with guide rails 210 and 212 which define the path of travel of containers thereon. Each of the guide rails 210 terminate, as indicated at 214, adjacent the endless conveying elements 36' and 38'. Guide rails 212, however, converge toward one another and parallel to the path of travel of the endless conveying elements 36' to a point adjacent the infeed ends of a pair of helically threaded elements 216 and 218. The elements 216 and 218 are mounted above the table 206 and are symmetrically out of phase with one another and when they rotate, they will alternately feed containers from the infeed rows of containers so that the containers may be interposed with one another.

Endless conveying elements 36' and 38' may be provided with spring-urged shoes 220 mounted on a frame structure 222. The shoes keep the chains of the conveying elements 36' and 38' fairly taut under normal operation but permit the blocks 44 to have a certain lateral and pivotal movement with respect to the opposing guide rails 212. The action of the conveying elements 36' and 38' is substantially the same as that described with respect to conveying elements 36 and 38, in that the blocks 44 wedge between the containers and the container will either go forward or behind a block, depending on its relationship with the block it engages when it reaches the end of guide rail 214.

As shown in Figure 7, once the containers come under the influence of the conveying elements 36' and 38' they are sliding over the flat top of the table structure 206. Of course auxiliary flat-top conveying elements, such as described with respect to Figure 1, could be provided, if so desired. The conveying elements 36' and 38' are symmetrically out of phase with one another so that they can deliver containers precisely to the threads of the helically threaded elements 216 and 218.

Helically threaded elements 216 and 218 are mounted for rotation on parallel horizontal axes and each have a thread which has an increasing pitch so that the spacing and velocity of the containers are progressively increasing. Guide rails 224 oppose each of the elements 216 and 218 so as to maintain containers within the threads as they are conveyed across the flat top of the worktable 206. A center guide member 226, having lateral surfaces 228 and 230, converge toward one another. However, it will be noted that in this particular instance the apex 232 of the center guide element 226 is offset so that the direction of containers traveling with the helical threaded element 216 is changed.

Associated with the helical elements 216 and 218 are a pair of endless conveying elements 234 and 236, each of these elements having a plurality of tapered block members 238 defining article-receiving pockets. The endless conveying element 234 passes around a sprocket 240 adjacent the infeed dial 200 and a second sprocket 242 adjacent the end of the threaded element 216. The blocks 238 defining the flights of the endless conveying element 234 have a pitch substantially equal to the diameter of the containers being combined. The endless conveying element 234 is operated in timed sequence with the element 216 so that alternate pockets are adapted to receive containers as they are delivered from the end of the element 216.

Endless conveying element 236 passes around a drive sprocket 248 and a second sprocket 250 positioned adjacent the outfeed end of helical conveying element 218. The blocks 238 defining flights of the endless conveying element 236 likewise have a pitch substantially equal to the diameter of a container. The endless conveying element 236 is arranged to receive containers in alternate pockets from the end of helical conveying element 218. As will be noted in Figure 7, containers from the helical conveying elements 216 and 218 are interposed between one another in a single line by the endless conveying elements 234 and 236 at the point indicated at A. Elements 234 and 236 have their pockets in registry at A and, consequently, it is now obvious that the elements 234 and 236 are so timed as to receive the containers in alternate pockets of each, which are symmetrically out of phase with one another.

It is desirable to maintain individual engagement and positive control of the containers as they are being combined, especially if the containers are traveling at high linear speeds. An idler sprocket 246 is provided for endless conveying element 234, the sprocket being arranged to oppose the sprocket 248 of endless conveying element 236 adjacent the point A where containers are combined into a single row. The sprockets 246 and 248 are each provided with an annular collar 252, which is adapted to carry a plurality of spring-urged plunger members 254. As best shown in Figure 8, each of the plunger members 254 include a plunger 256 having a head 258 for engaging a container, the plunger 256 passing through a radially extending aperture 260 in the collar 252. A spring 262 normally urges the plunger 256 in an outward direction, and a stop member 264 mounted on the plunger limits its outward movement.

The plunger members 254 of sprocket 246 are adapted to cooperate with the article-free pockets of the endless conveying element 234, whereas the plunger 254 of sprocket 248 cooperate with the article-free pockets on the endless belt 236. In other words, the plunger members 254 are circumferentially spaced on the sprocket members 246 and 248 in such a manner that they will cooperate with every other pocket on the endless conveying elements 234 and 236 respectively. However, the sprockets 246 and 248 are so arranged with respect to one another that the plunger members 254 of each are symmetrically out of phase with each other so that the plunger members 254 of the sprocket 246 cooperate with the article-filled pockets in the endless conveying element 246, where the plunger members 254 of the sprocket 248 cooperate with the article-filled pockets of the endless conveying element 234. As containers are picked up by the conveying elements 234 and 236, they are conveyed over the surface of table 206 by the elements until they reach the apex 232 of the guide member 226. At this point, the opposing plunger member 254 will engage a container carried by an opposing endless conveying element. The plunger will maintain the container in its pocket and as the container is advanced, the plunger will be actuated by the container to move radially inwardly against the action of spring 262 until the container passes the point where the pockets of conveying element 234 are in registry with the pockets of the conveying element 236. By providing the container-actuated plunger members 254, the containers are maintained in the pockets of the respective endless conveying elements until they are interposed between one another in a single row.

As previously mentioned, the endless conveying element 234 passes around a sprocket 240 positioned adjacent the rotary infeed dial 200. A guide rail 266, extending at least from the point A where the pockets of endless conveying elements 234 and 236 are in registry to a point adjacent the rotary infeed dial 200, opposes the endless conveying element 234 so as to maintain the containers within the pockets of the belt as they are conveyed to the infeed dial. The containers are slid along the surface of the table 206 by the blocks 238 of the belt 234 and, since the pockets of the blocks 238 of endless conveying element 234 are in registry with the rotary dial 200, containers are successively delivered to the pockets of dial 200. While it has been disclosed that the containers are slid across the surface of table 206, it is of course within the scope of the present invention to provide the article supporting and conveying element of the flat-top endless conveying type, as described with respect to Figure 1, or a chain type conveyor having lugs to engage the bottom of the container.

Figure 9:
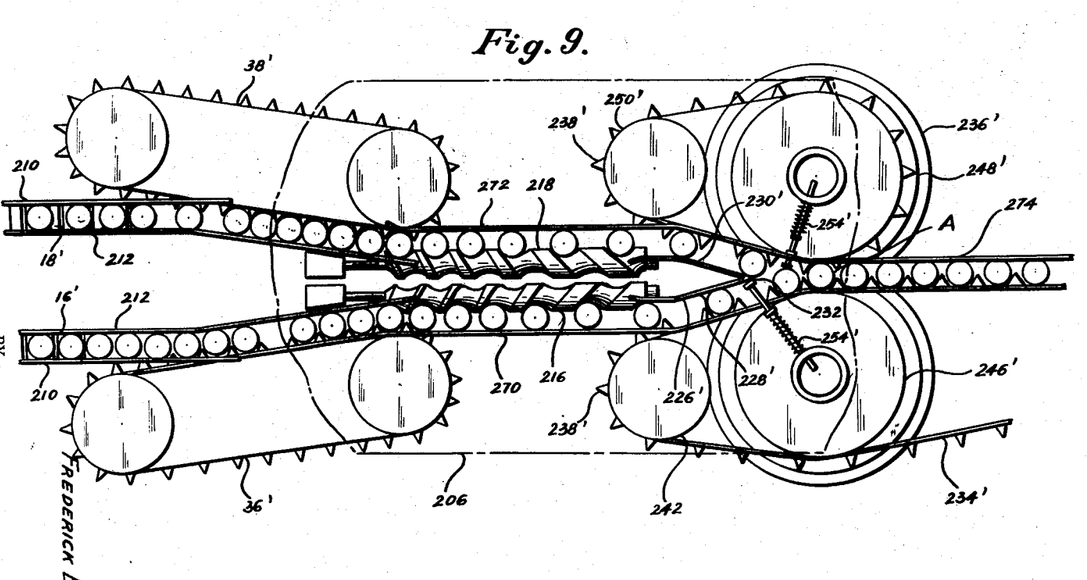
Figure 9 is a schematic plan view of still another modified form of the invention and showing a combining mechanism substantially similar to that of Figure 7 but where containers are combined in a line substantially parallel to the infeed lines.

Referring now to Figure 9, a further modification of the present invention is disclosed for combining containers traveling in separate rows into a single row. It is contemplated that the invention disclosed in Figure 9 can be utilized where it is desired to combine the containers into a single row at a considerable distance from the machine on which the next operation on the containers is performed.

The combining mechanism disclosed in Figure 9 is substantially similar to that disclosed in Figure 7, in that containers are delivered by flat-top container-conveying elements 16' and 18' in two rows, to the table structure represented by the numeral 206. The containers traveling between the guide rails 210 and 212 for the conveying elements 16' and 18' are delivered to the pockets of endless conveying elements 36' and 38', which in turn transfers and delivers the containers to the threads of the pair of helically threaded conveying elements 216 and 218. As previously explained with respect to Figure 7, the elements 216 and 218 have their threads symmetrically out of phase with one another and have an increasing pitch so that the velocity and spacing of the containers is progressively increased.

A guide member 226' having lateral surfaces 228' and 230' converge toward one another and terminate in an apex 232' which is centrally positioned between the elements 216 and 218. Guide rails 270 and 272 oppose the elements 216 and 218 respectively, to maintain the containers within the threads as they are being conveyed thereby. The guide rails 270 and 272 converge toward one another and define paths with the lateral surfaces 228' and 230' of guide member 226' for the containers when they leave the elements 216 and 218.

An endless conveying element 234' having tapered blocks 238' defining pockets operates in timed sequence with the element 216 so as to receive containers in alternate pockets and maintain control over the containers at least until the containers are combined with containers under the control of element 218. An endless conveying element 236' having a plurality of tapered blocks 238' defining pockets cooperates with the element 218 to receive containers in alternate pockets and convey them to a point where they are combined. The endless conveying element 234' passes around a sprocket 242' positioned adjacent the outfeed end of conveying element 216, an idler sprocket 246' and a drive sprocket (not shown, but positioned at some adjacent point from the point where the containers are combined). The endless conveying element 236' passes around the sprockets 248' and 250'. The sprockets 246' and 248' have plunger members 254' which operate identically with the plunger members 254 previously described with respect to Figure 7. Plunger members 254' maintain the containers in the pockets of the opposing belt until at least the containers reach the position A where they are combined.

It will be noted that in the combining mechanism of Figure 9, the conveying element 234' extends from the point A of combining along the path of travel desired of the containers in a direction generally parallel to the direction of containers traveling on elements 16' and 18'. A guide rail 274 opposes the conveying element 234' so as to maintain containers in the pockets of the element 234'. The containers may be either slid over the table top 206 by the conveying element 234' or an endless flat-top type of conveyor, such as described with respect to Figure 1, or the like, may be provided to assist in supporting and transferring the containers. The mechanism disclosed in Figure 9 is particularly adaptable for combining containers in separate rows into a single row and feeding the containers in the single row, at high linear velocity, to a remote distance from the point of combining.

The terminology used in this specification is for the purpose of description and not limitation, the scope of the invention being defined in the claims.

I claim:

1. In a mechanism for feeding articles: a first conveyor means including two article supporting and conveying elements; a second conveyor means including an article supporting element for supporting articles in a row; and means to transfer and combine articles alternately from the article conveying elements of the first conveyor means to the article supporting element of said second conveyor means, said transfer means including a pair of endless conveying elements each having a plurality of flights defining article receiving pockets, one of said endless conveying elements being arranged to receive articles from one of said article conveying elements of said first conveyor means in alternate pockets thereof and the other of said endless conveying elements being arranged to receive articles from the other of said article conveying elements of said first conveying means in alternate pockets thereof, said endless conveying elements being further arranged to have an article free pocket of one of said elements move during a portion of its travel in registry with an article filled pocket of the other of said endless conveying elements so as to substantially encompass an article, and movable plunger means extending into article free pockets of each of said endless conveyor elements at least during a portion of their travel, said movable plunger means engaging an article traveling in a pocket of an opposed endless conveying element and maintaining the article in the pocket until the pocket is in registry with the article free pocket of the other endless conveying element.

2. A mechanism of the character described in claim 1 wherein said flights are tapered blocks having a pitch substantially equal to the diameter of articles being conveyed.

3. A mechanism of the character described in claim 2 wherein said tapered blocks are nylon.

4. A mechanism of the character described in claim 2 wherein said tapered blocks engage articles at spaced vertical points.

5. A mechanism of the character described in claim 1 wherein said plunger means are resiliently urged into article free pockets of said endless conveying elements and wherein said plunger means are actuated by engagement with an article in an article filled pocket of the opposed endless conveying element.

6. In a mechanism for feeding articles: a pair of endless conveying elements for transferring and combining rows of articles, each of said endless conveying elements having a plurality of flights arranged respectively to move during a portion of their travel in a linear direction toward one another and then in another portion of their travel in registry with one another so as to substantially encompass an article, means to deliver articles to alternate pockets of each of said conveyor elements, and plural movable means cooperating with alternate pockets of each of said conveying elements, said last-mentioned means engaging an article traveling in a pocket of one of said endless conveying elements and maintaining the article in the pocket until the pocket is in registry with an article free pocket of the other endless conveying element.

7. In a mechanism for feeding articles: a first conveyor means including two article supporting and conveying elements; a second conveyor means including an article-supporting element and means to transfer and combine articles alternately from the article-conveying elements of the first conveyor means to the article-supporting element of the second conveyor means, said transfer means including a pair of endless conveying elements each having a plurality of flights defining article-receiving pockets, one of said endless conveying elements arranged to receive articles from one of said article-conveying elements of said first conveying means and the other of said endless conveying elements being arranged to receive articles from the other of said article-conveying elements of said first conveyor means, said endless conveying elements each being arranged to move articles received from said first and second article-conveying elements in a linear direction toward one another and be interposed between one another in a line; and plunger means cooperating with alternate pockets of each of said endless conveying elements for maintaining articles in the pockets of the conveying elements, said last-mentioned means cooperating with a pocket of one of said endless conveying elements adapted to maintain an article in a plunger-free pocket of the other of said endless conveying elements until the article is positioned on said second conveyor means.

8. A mechanism of the character described in claim 7 wherein at least one of said endless conveying elements maintains articles in spaced relationship to each other while traveling on said second conveyor means.

9. A mechanism of the character described in claim 7 including means to transfer articles from said first and second conveyor elements to pockets of said first and second endless conveying elements, said last-mentioned means being arranged to control the spacing of articles being received by said first and second endless conveying elements so that articles are received in alternate pockets of each of said endless conveying elements, the articles received by one endless conveying element being out of phase with the articles being received by alternate pockets of the other of said endless conveying elements.

10. A mechanism of the character described in claim 9 wherein said last-mentioned transfer and article-spacing means includes a pair of helically threaded elements symmetrically out of phase with each other and having their axes substantially parallel to one another.

11. In a mechanism for feeding articles: a first conveyor means including first and second article-supporting and conveying elements; a second conveyor means in transfer relation with said first conveyor means for receiving articles from said first and second conveying elements in a row; means to transfer articles alternately from said first and second article-supporting and conveying elements and combine the articles on said second conveyor means, said transfer means including a pair of helically threaded elements, one of said helically threaded elements being associated with one of said conveying elements and the other of said helically threaded elements being associated with the other of said conveying elements, said helically threaded elements being symmetrically out of phase with each other, and a pair of endless conveying elements positioned on opposite sides of said second conveyor means, each of said endless conveying elements having a plurality of tapered blocks defining article-receiving pockets, the pockets of one of said endless conveying elements cooperating with one of said threaded elements and the pockets of the other of said endless conveying elements cooperating with the other of said helically threaded elements, said endless conveying elements being arranged respectively to transfer articles in a linear direction toward each other and to have their pockets in registry with each other during a portion of their travel so that articles are substantially encompassed in pockets in registry; means cooperating with alternate pockets of each of said endless conveying elements, said means engaging an article traveling in a pocket of one of said endless conveying elements and maintaining the article in the pocket until the pocket is in registry with an article-free pocket of the other endless conveying elements; and means to individually engage and space articles traveling on said first and second conveying elements and deliver the articles to the threads of the respective helically threaded elements.

References Cited in the file of this patent

UNITED STATES PATENTS

| | | |
|---|---|---|
| 1,242,738 | Taliaferro | Oct. 9, 1917 |
| 1,828,168 | Ayars | Oct. 20, 1931 |
| 2,156,105 | Bergmann | Apr. 25, 1939 |
| 2,801,650 | Breeback | Aug. 6, 1957 |
| 2,827,998 | Breeback | Mar. 25, 1958 |